United States Patent
Foote

(10) Patent No.: US 12,433,247 B2
(45) Date of Patent: Oct. 7, 2025

(54) ELECTRIC STRAND GATE

(71) Applicant: LN AUTOMATION PTY LTD, Ocean Grove (AU)

(72) Inventor: Nathan Foote, Ocean Grove (AU)

(73) Assignee: LN AUTOMATION PTY LTD, Ocean Grove (AU)

( * ) Notice: Subject to any disclaimer, the term of this patent is extended or adjusted under 35 U.S.C. 154(b) by 0 days.

(21) Appl. No.: 18/567,314

(22) PCT Filed: Jun. 24, 2022

(86) PCT No.: PCT/AU2022/050640
§ 371 (c)(1),
(2) Date: Dec. 5, 2023

(87) PCT Pub. No.: WO2023/283675
PCT Pub. Date: Jan. 19, 2023

(65) Prior Publication Data
US 2024/0268339 A1    Aug. 15, 2024

(30) Foreign Application Priority Data

Jul. 15, 2021   (AU) ................................ 2021902166

(51) Int. Cl.
*A01K 3/00* (2006.01)
*E06B 11/02* (2006.01)

(52) U.S. Cl.
CPC ............ *A01K 3/006* (2021.08); *E06B 11/021* (2013.01); *E06B 11/025* (2013.01); *E05Y 2900/40* (2013.01)

(58) Field of Classification Search
CPC ........ A01K 3/004; A01K 3/005; A01K 3/006; A01K 1/0017; E06B 11/02; E06B 11/04; E06B 11/021; E06B 11/025
See application file for complete search history.

(56) References Cited

U.S. PATENT DOCUMENTS 2,476,233 A * 7/1949 Wood ................... H01B 17/145
256/10
2,512,740 A * 6/1950 Evans .................... A01K 3/004
49/34
(Continued)

FOREIGN PATENT DOCUMENTS

GB      2206906 A      1/1989
GB      2519618 A      4/2015

OTHER PUBLICATIONS

International Search Report & Written Opinion dated Aug. 31, 2022 from PCT Application No. PCT/AU2022/050640.
(Continued)

*Primary Examiner* — Justin B Rephann
(74) *Attorney, Agent, or Firm* — INNOVATION CAPITAL LAW GROUP, LLP; Vic Lin

(57) ABSTRACT

An electric strand gate has at least one electric strand thereacross. The gate comprises an actuator which moves the electric strand up along a hoisting rail from a closed position to an open position, thereby providing clearance thereunderneath for passage of livestock, vehicles and or the like through the gate. The gate may have shuttles travelling along the hoisting rail, each of which is connected to a respective electric strand. The rail and shuttles may be configured so that electric strands are closer together when in the open position, thereby maximising clearance thereunderneath whilst moving apart in the closed position, so as to maintain the full height of the electric fence. The shuttles and the rail may be further configured so that the electric strands are electrically disconnected in the open position.

20 Claims, 6 Drawing Sheets

(56) References Cited

U.S. PATENT DOCUMENTS

| | | | | |
|---|---|---|---|---|
| 2,555,180 A * | 5/1951 | Adkins | A01K 3/005 | |
| | | | 256/10 | |
| 2,605,565 A * | 8/1952 | Meyer, Jr. | H01B 17/145 | |
| | | | 256/10 | |
| 2,633,337 A * | 3/1953 | Nieuwenhuis | A01K 3/004 | |
| | | | 256/10 | |
| 2,642,683 A * | 6/1953 | Meyer, Jr. | A01K 1/0017 | |
| | | | 256/10 | |
| 2,711,037 A | 6/1955 | Tallman | | |
| 2,731,744 A * | 1/1956 | Schnell | E06B 11/02 | |
| | | | 49/59 | |
| 2,769,617 A * | 11/1956 | Hutchinson | A01K 3/006 | |
| | | | 256/10 | |
| 2,893,142 A * | 7/1959 | Logan | A01K 3/006 | |
| | | | 256/10 | |
| 2,899,174 A * | 8/1959 | Wells | A01K 3/004 | |
| | | | 256/10 | |
| 3,491,480 A * | 1/1970 | Nickel | A01K 3/004 | |
| | | | 49/59 | |
| 3,756,566 A * | 9/1973 | Bangs | A01K 3/004 | |
| | | | 256/10 | |
| 4,493,480 A * | 1/1985 | Nichol | A01K 1/0017 | |
| | | | 256/10 | |
| 4,922,655 A * | 5/1990 | Seal | E06B 11/02 | |
| | | | 160/331 | |
| 5,072,915 A * | 12/1991 | Shirley | A01K 3/004 | |
| | | | 256/10 | |
| 5,160,120 A * | 11/1992 | Sims | A01K 3/002 | |
| | | | 256/17 | |
| 5,419,083 A * | 5/1995 | Rass | A01K 3/005 | |
| | | | 49/327 | |
| 6,241,217 B1 * | 6/2001 | Tally | B21F 9/002 | |
| | | | 256/37 | |
| 6,519,131 B1 * | 2/2003 | Beck | A01K 15/04 | |
| | | | 361/232 | |
| 9,265,230 B2 * | 2/2016 | Van Aalst | A01K 3/005 | |
| 2003/0005637 A1 * | 1/2003 | Regner | E06B 11/04 | |
| | | | 49/227 | |

OTHER PUBLICATIONS

International-type search report dated May 12, 2022 from AU Application No. 2021902166.

* cited by examiner

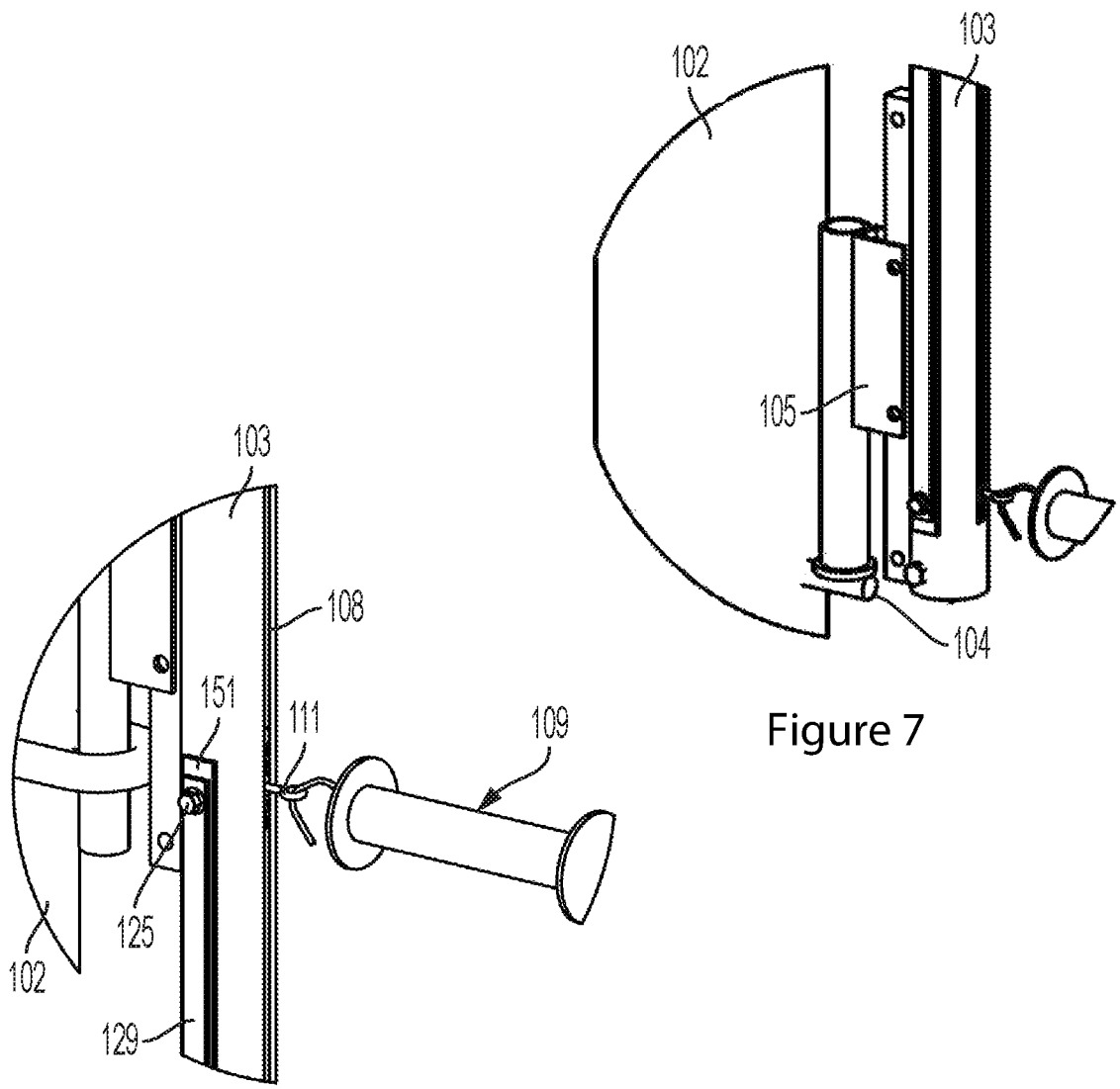
Figure 7
Figure 8
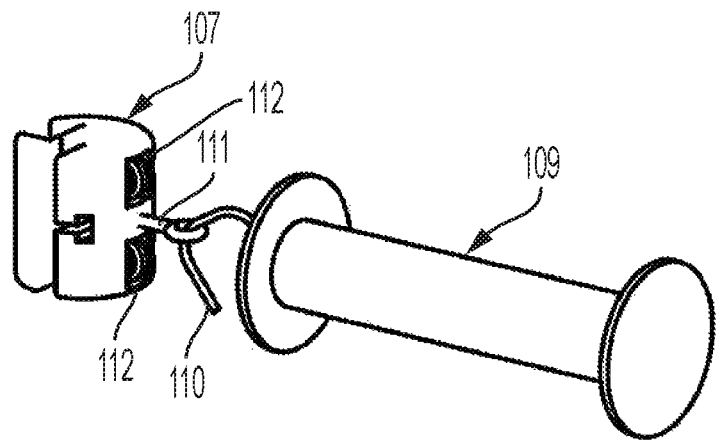
Figure 9

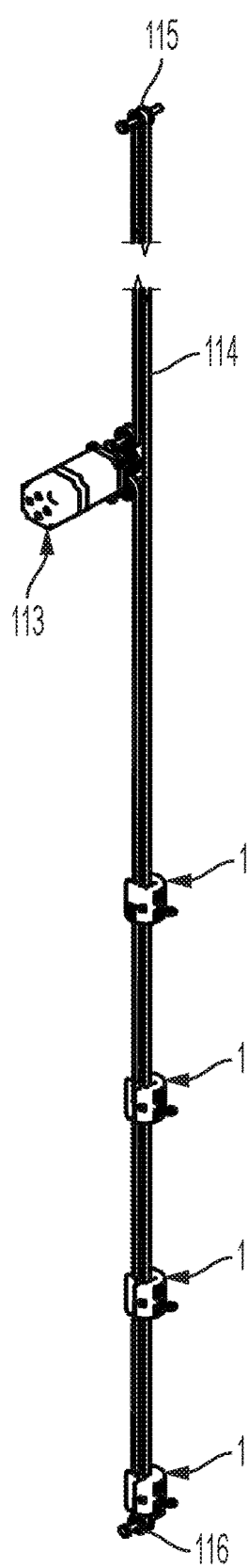
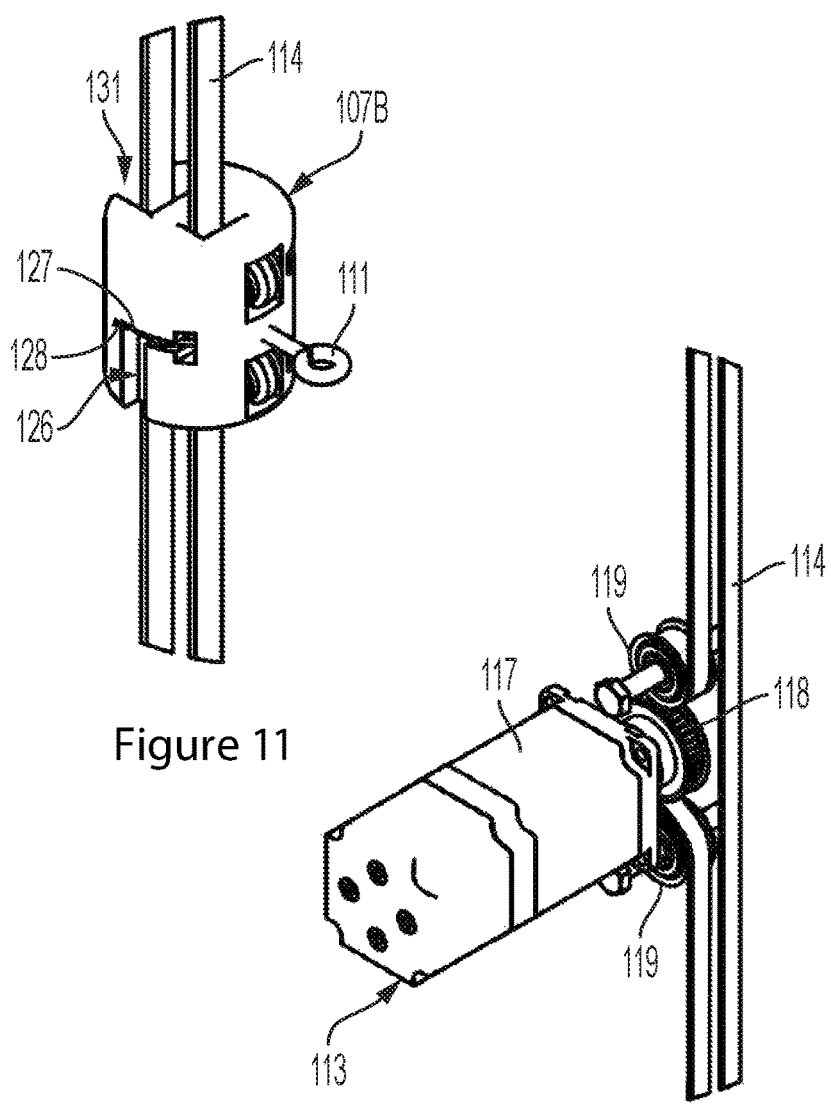
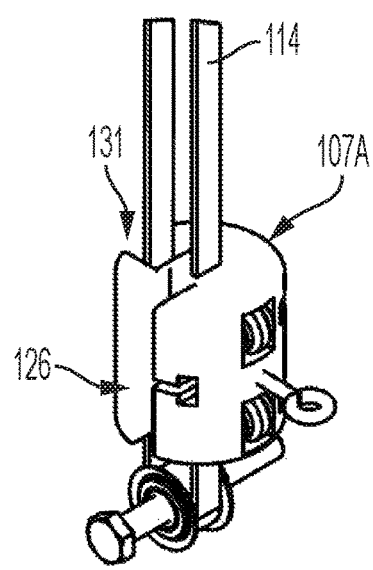
Figure 10
Figure 11
Figure 12
Figure 13

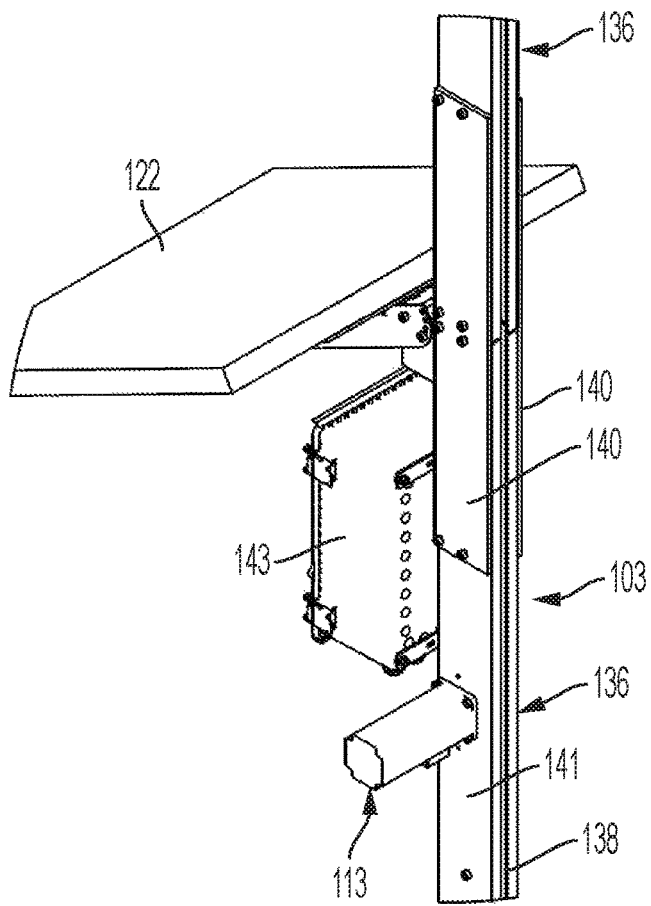
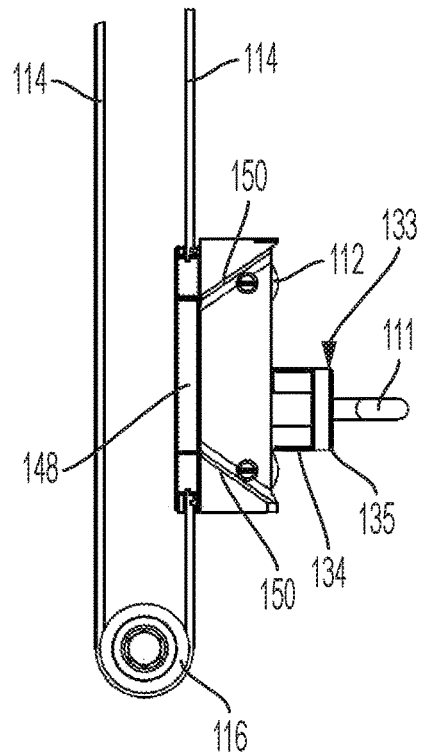
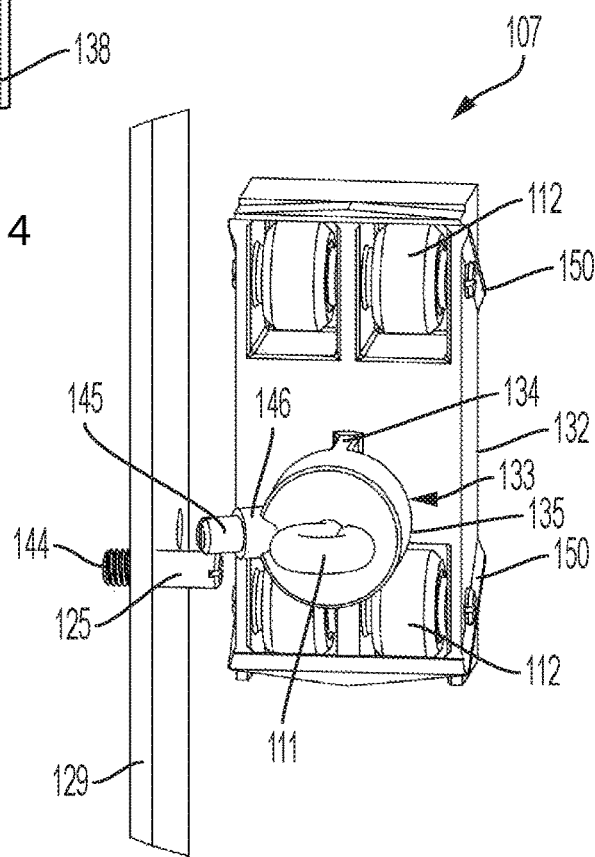
Figure 14
Figure 15
Figure 16

ELECTRIC STRAND GATE

FIELD OF THE INVENTION

This invention relates generally to electrified fencing and, more particularly, this invention relates to an electric strand gate that has an actuator that automatically hoists electric strands thereof up along a hoisting rail from a closed position to an open position for passage of livestock, vehicles and or the like therethrough.

BACKGROUND OF THE INVENTION

Rural fencing employs electrified fencing for confining livestock, preventing intrusion and the like.

Gates through electric fencing may have electric strands which are each disconnectable using insulated handles thereof or have swing gates, both of which however are inconvenient to open and close.

The present invention seeks to provide a way to overcome or substantially ameliorate at least some of the deficiencies of the prior art, or to at least provide an alternative.

It is to be understood that, if any prior art information is referred to herein, such reference does not constitute an admission that the information forms part of the common general knowledge in the art, in Australia or any other country.

SUMMARY OF THE DISCLOSURE

There is provided herein an electric strand gate and at least one electric strand thereacross. The gate comprises an actuator which moves the electric strand up along a hoisting rail from a closed position to an open position, thereby providing clearance thereunderneath for passage of livestock, vehicles and or the like through the gate.

The gate may be remotely controlled so as to even allow for automatic opening without having to step from a vehicle and for automatic closing once the vehicle has passed therethrough.

The gate may use shuttles travelling along the hoisting rail, each of which is connected to a respective electric strand. The hoisting rails may be disassembled for sale and supply prior installation, being demountable after installation and which may be attached to existing gate hardware in a height adjustable manner.

The rail and shuttles may be configured so that the electric strands are closer together when in the open position, thereby maximising clearance thereunderneath whilst moving apart in the closed position, so as to maintain the full height of the electric fence. The shuttles and the rail may be further configured so that the electric strands are electrically disconnected in the open position.

Other aspects of the invention are also disclosed.

BRIEF DESCRIPTION OF THE DRAWINGS

Notwithstanding any other forms which may fall within the scope of the present invention, preferred embodiments of the disclosure will now be described, by way of example only, with reference to the accompanying drawings in which:

FIG. 7 shows a magnified view of a lower end of the hoisting rail;

FIG. 8 shows a magnified view of the hoisting rail at an upper end of a gate post;

FIG. 9 shows a hoisting rail shuttle attached to an electric strand insulative handle in accordance with an embodiment;

FIG. 10 shows the actuator comprising looped belt driven by a drive motor in accordance with an embodiment;

FIG. 11 shows and uppermost shuttle of the hoisting rail;

FIG. 12 shows a magnified view of the drive motor in further detail;

FIG. 13 shows a lowermost shuttle of the hoisting rail in accordance with an embodiment;

FIG. 14 shows a hoisting rail arrangement in accordance with a further embodiment;

FIG. 15 shows a side view of a lowermost hoisting rail shuttle in accordance with a further embodiment;

FIG. 16 shows a perspective view of an upper hoisting rail shuttle;

DESCRIPTION OF EMBODIMENTS

An electric strand gate 100 has at least one electric strand 101 thereacross and an actuator which hoists the electric strand 101 up from a closed position to an open position. In the open position, the electric strand 101 provides clearance thereunderneath for passage of livestock, vehicles and the like through the gate 100.

The gate 100 may be configured to provide at least 2 m of clearance for livestock and passenger vehicles but, in embodiments may provide higher clearance for trucks and semi-trailers, such as in excess of 4 m.

In embodiments, the lifting height of the strands 101 may be adjusted so that, for example, the actuator may lift the strands 101 only to 2 m to allow a 1.5 m high vehicle to pass therethrough but which could be lifted higher for other types of taller vehicles. In this regard, the height of the strands 101 may be controlled dynamically by a remote controller.

Figure 3:
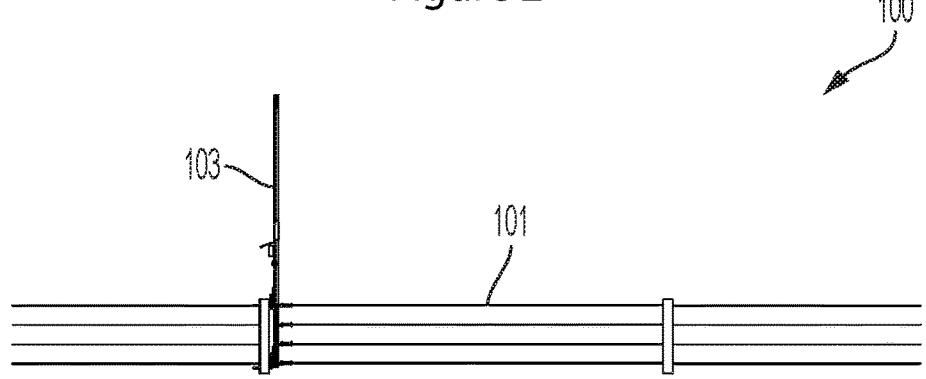
FIG. 3 shows an electric strand gate in a closed position in accordance with a further embodiment.
Figure 4:
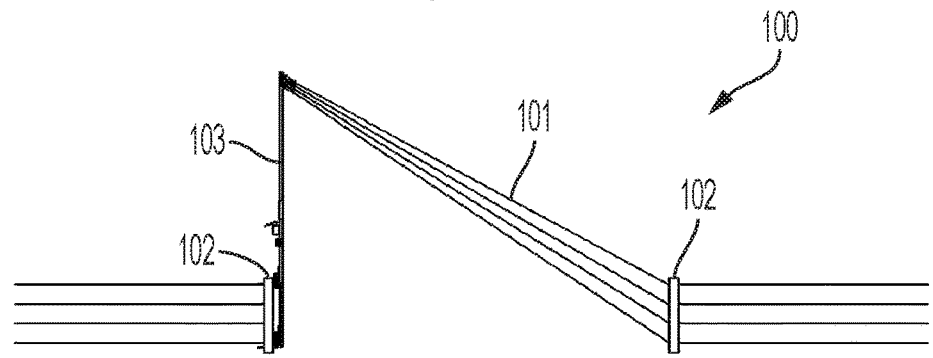
FIG. 4 shows the electric strand gate of FIG. 3 in an open position.
Figure 5:
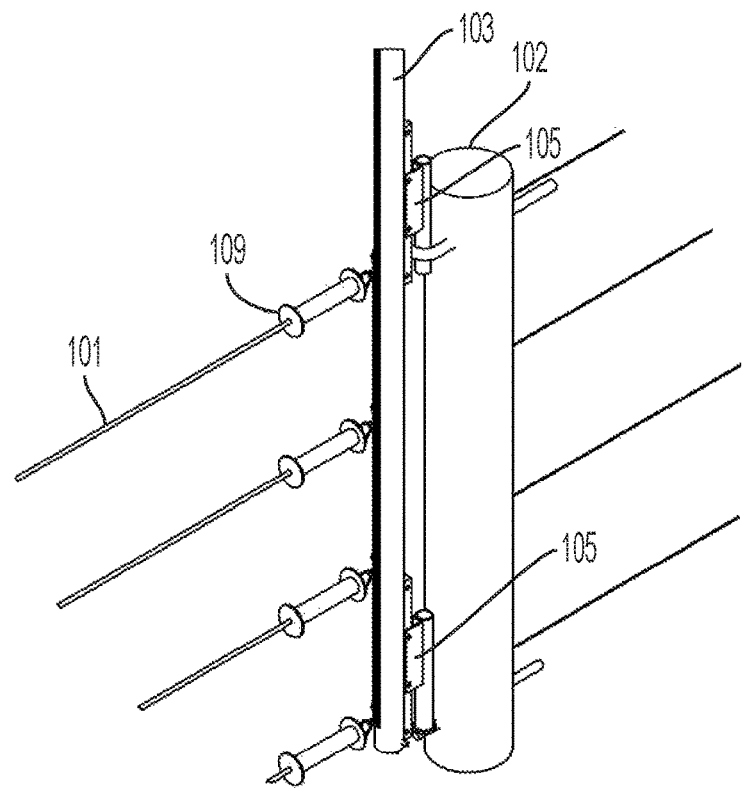
FIG. 5 shows a magnified perspective view of a hoisting rail of the gate attached to a fencepost in accordance with an embodiment.

In the embodiment shown in FIGS. 3 and 4, the actuator hoists only one side of the electric strand 101. In accordance with this embodiment, the electric strand 101 may lengthen across the gate as one side thereof moves up. The electric strand 101 may be stretchable such as by comprising an elasticised bungee cord with electrified wiring weave or alternatively comprise a coil spring. In embodiments, the electric strand 101 may unspool from a reel. In embodiments, a spring or stretchable section may be coupled with a non-stretchable strand section to allow the strand 101 to lengthen.

Figure 1:
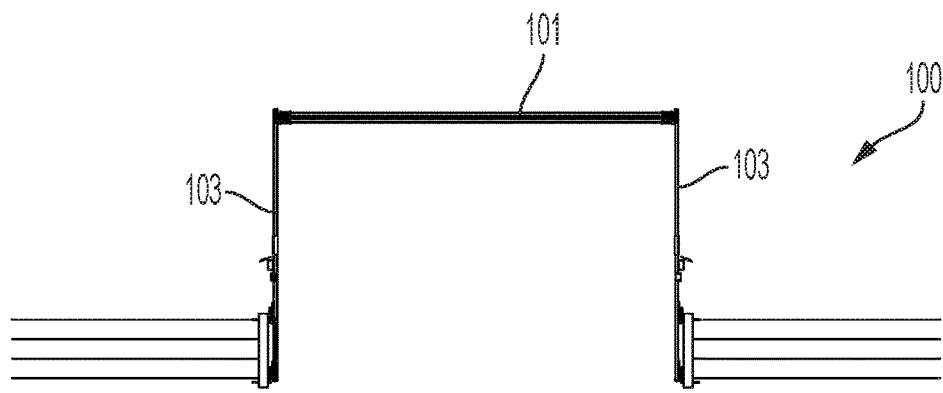
FIG. 1 shows an electric strand gate in an open position in accordance with an embodiment.
Figure 2:
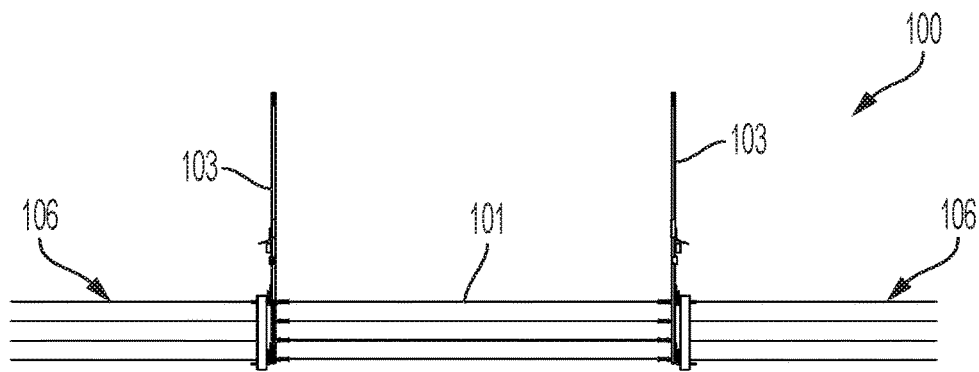
FIG. 2 shows the gate of FIG. 1 in a closed position.

Alternatively, in accordance with the embodiment shown in FIGS. 1 and 2, the actuator hoists both sides of the electric strand 101 so that the electric strand 101 remains substantially horizontal between the closed position shown in FIG. 2 and the open position shown in FIG. 1.

The gate 100 may comprise at least one vertical hoisting rail 103 with the electric strand 101 travelling along the hoisting rail 103.

In the one-sided embodiment shown in FIGS. 3 and 4, the gate 100 comprises a single hoisting rail 103 only. However, for the both-sided embodiment shown in FIGS. 1 and 2, the gate 100 comprises a pair of hoisting rails 103 so that the electric strand 101 remains substantially horizontal between the closed and open positions.

The at least one hoisting rail 103 may be connected between existing fence posts 102. Specifically, with reference to FIG. 7, the hoisting rail 103 may attach to standard gate mounting hardware 104 and may comprise a height adjustable bracket 105 to adjust the vertical height of the hoisting rail 103 with respect to the post 102.

In alternative embodiments, the rail 103 integrally forms a post 102 in that the lower section forms a structural post which may be embedded or concreted into the ground.

As will be described in further detail below, in embodiments, the at least one electric strand 101 electrically disconnects when moving to the open position. As such, when in the open position, the electric strand 101 is not electrified. However, when moving back to the closed position, the electric strand 101 closes the electrical circuit, thereby becoming electrified again.

In the preferred embodiments shown in FIGS. 1-4, the gate 100 comprises a plurality of electric strands 101 and the actuator hoists all of the electric strands up from the closed position to the open position.

In the embodiment shown, the number of electric strands 101 of the gate 100 may match the number and spacing of those of the adjacent electric fence 106. For example, as is shown in FIG. 2, the gate 100 supports four electric strands 101 matching the number and spacing of those of the adjacent electric fence 106.

As will be described in further detail below, the gate 100 may be configured so that the electric strands 100 are closer together when in the open position as compared to when in the closed position, thereby maximising clearance thereunderneath. Specifically, as is shown in the closed position FIG. 2, the electric strands 101 are spaced apart relatively wider as compared to when in the open position as shown in FIG. 1.

With reference to FIG. 9, the gate 100 may comprise a shuttle 107 for each respective electric strand 101 which travels along the hoisting rail 103. As is shown in FIG. 8, the hoisting rail 103 may comprise an open channel 108 therealong and wherein the shuttle 107 travels within the rail 103.

The shuttle 107 may be configured for connecting to existing electric strand insulative handles 109 having an end hook 110. In this regard, the shuttle 107 may expose a metallic eyelet 111 which engages the end hook 110. As is shown in FIG. 8, the metallic eyelet 111 may extend through the channel 108 along the rail 103.

The hooks 110 may yet be disconnected from the metallic eyelets 111 if needs be in the conventional manner. In embodiments, the channel 108 may be enclosed with the deflectable seal, such as a brush seal.

The shuttle 107 may be made of plastic. The shuttle 107 may have roller bearings 112 which bear against an inside edge of the rail 103 in opposition to the tension applied by the electric strand 101, thereby aiding the passage of the shuttle 107 within the rail 103.

As is shown in FIG. 10, the actuator may comprise a drive motor 113 driving a looped belt 114 along the hoisting rail 103. The belt 114 may go over an upper idler wheel 115 at an upper end of the hoisting rail 103 and under a lower idler wheel 116 at a lower end of the hoisting rail 103.

To disassemble/assemble the rail 114, the belt 114 may need to be loosened then tightened. As such, in embodiments, the rail 103 may comprise a mechanism allowing the user to loosen and tighten the belt 114 by hand.

With reference to FIG. 12, the drive motor 130 may comprise stepdown gearing 117 interfacing a drive wheel 118 acting on the belt 114. The drive wheel 118 may have teeth which engage corresponding notches or teeth of the belt 114. The drive wheel 118 may engage the belt 114 between adjacent idler wheels 119 to enhance purchase on the belt 114.

Figure 6:
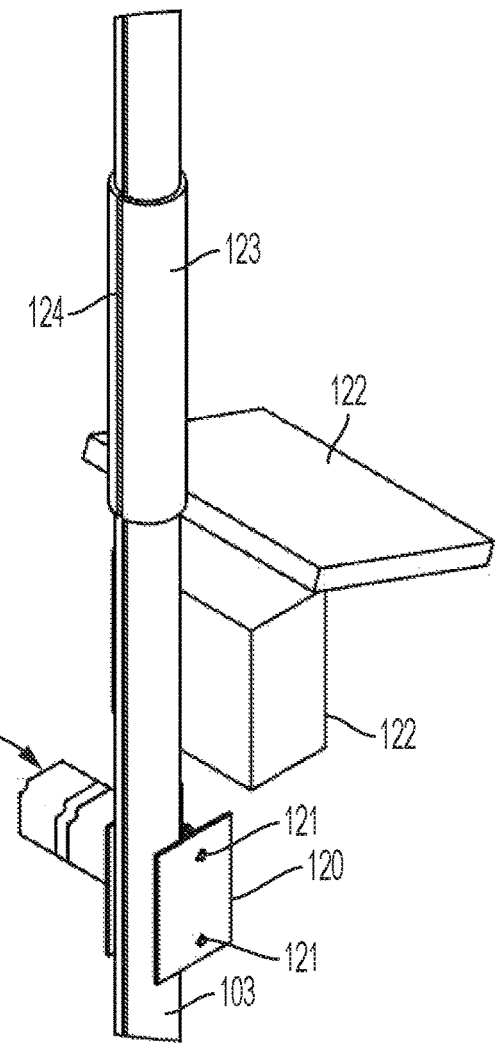
FIG. 6 shows a magnified perspective view of a gate controller in accordance with an embodiment.

With reference to FIG. 6, drive motor 113 may be attached to the hoisting rail 103, such as by interface plates 120 having idler wheel axles 121 therethrough. The post 103 may further support a control box 122 which may have a battery for the drive motor 113. A solar panel 122 may recharge the battery. In embodiments, the gate 100 may comprise an external power supply electrical connection for connection to an external power source if needs be.

The control box may comprise a gate controller, including a gate controller having a remote-control receiver, timing circuits and the like.

As is further shown in FIG. 6, the hoisting rail 103 may be formed in sections joined by interconnecting sleeves 123 also having an open channel 124 therealong. As such, the hoisting rail 103 may be disassembled for sale and supply or to be demountable.

With reference to FIG. 10, there is shown the belt 114 interfacing a shuttle 107 for each respective electric strand 101. FIG. 13 shows a lowermost shuttle 107A in FIG. 11 shows an uppermost shuttle 107B.

The lowermost shuttle 107 may be affixed to the belt 114 whereas the other shuttle 107 thereabove slidably engage the belt 114. As such, when going up to the open position, the lowermost shuttle 107A may collect the other shuttles 107 thereabove on the way up. As such, the electric strands 101 may be close together in the open position as shown in FIG. 1.

Each shuttle 107 may comprise a rear return channel 131 accommodating the return of the belt 114 therethrough.

With reference to FIG. 8, the rail 103 may comprise stoppers 125 which catch respective shuttles at respective positions in the closed position. In the embodiment shown, each stopper 125 is a bolt going into the rail 103.

Each shuttle 107 may comprise a side channel 126 having an engagement edge 127. The side channels 126 above the engagement edge 127 of lower shuttles 107 increase in depth and the stoppers 125 may protrude to respective extents which increases towards lower stoppers 125.

For example, the side channel 126 of the lowermost shuttle 107A is completely open whereas the side channel 126 above the engagement edge 127 of the uppermost shuttle 107 is effectively nil. The depth of side channels 126 above the engagement edge 127 of shuttles 107 therebetween would range between the depths of the uppermost shuttle 107B and the lowermost shuttle 107A.

As such, when the shuttles 107 move down, the lowermost shuttle 107A having the deepest channel 126 can move past all of the stoppers whereas the next shuttle 107 thereabove having the next deepest channel could move past all of the stoppers 125 except the penultimate stopper 125 and so on until each shuttle 107 is caught by a respective stopper 125.

Each shuttle 107 may comprise a metallic contact plate 128 which forms an electric contact with the metallic stopper 125 when the engagement edge 127 rests on the stopper 125. The contact plate 128 may be electrically connected to the metallic eyelet 111. With reference to FIG. 8, a metallic conductor 129 may run along the rail 103 yet be insulated therefrom by an insulative backing 151. Each stopper 125 may electrically connect with the conductor 129 to thereby make electrical contact with the respective contact plates 128 of the shuttles 107. As such, when each shuttle 107 is caught by a respective stopper 125, an electrical circuit between the conductor 125 and the respective electric strand 101 is established.

Figure 17:
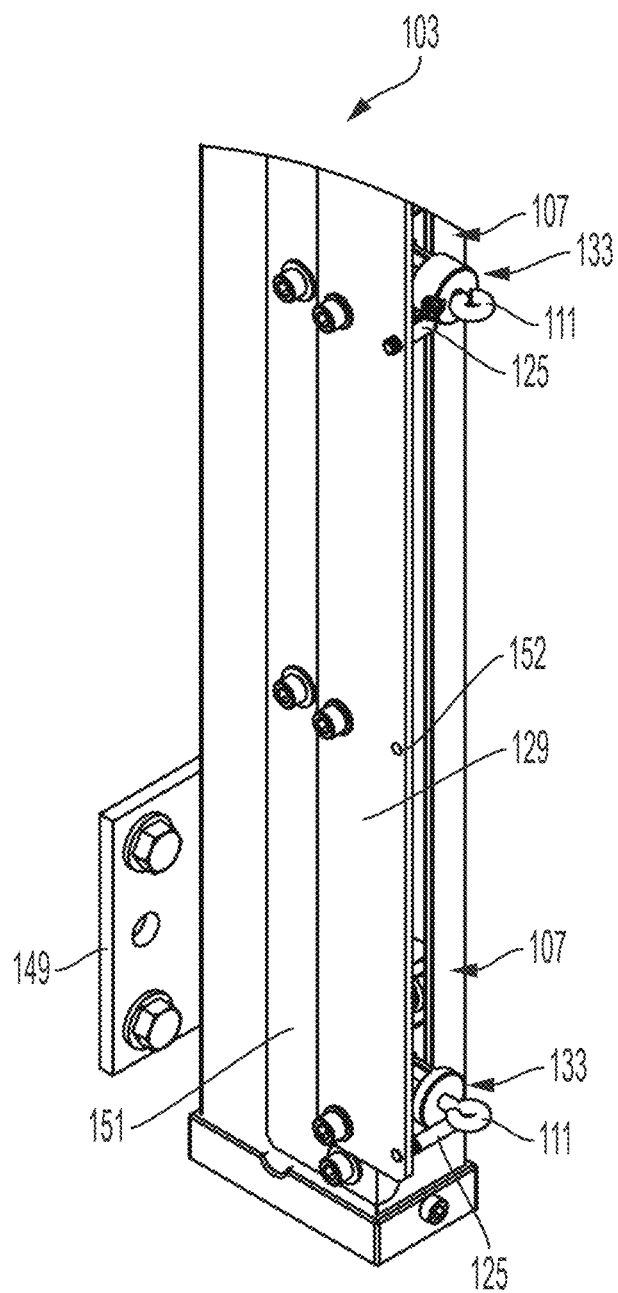
FIG. 17 shows a magnified perspective view of the hoisting rail arrangement of FIG. 14.
Figure 18:
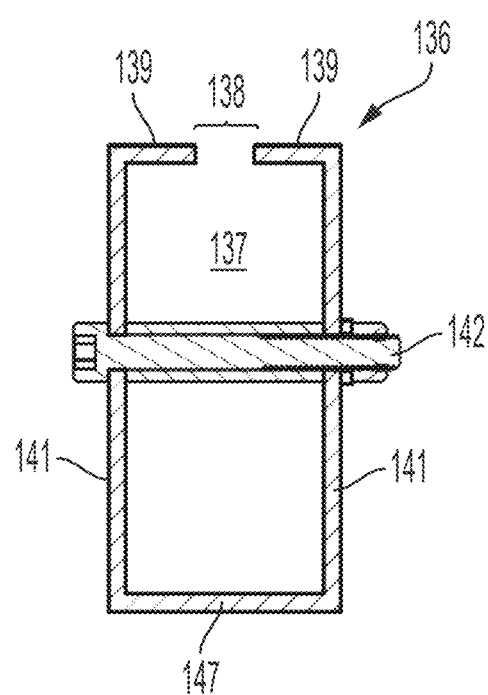
FIG. 18 shows a hoisting rail channel in accordance with an embodiment.

FIGS. 15-18 show a further embodiment wherein the rail 103 is generally rectangular and which may be formed by the C-channel 136 shown in FIG. 18. The C-channel 136 may be defined by sides 141, an end 147 and flanges 139 at an opposite end defining a gap 138 therebetween. The C-channel 136 may define a channel 137 therethrough through which the shuttle 107 travels.

FIG. 14 shows how the motor 140 may engage the belt 114 directly through a side 141 of the channel 136.

A plurality of C-channel sections 136 may be joined together with planar splice plates 141 either side, thereby forming a rail 103 of any length FIG. 16 shows an embodiment wherein the shuttle 107 is defined by a generally rectangular body 132. The body 132 may comprise apertures for engaging a quadrant of roller bearings 112 which run along respective inner sides of the channel 136. In embodiments, the body 132 may support a pair of in-line roller bearings 132 which roll along a V-shaped interior of the channel 136.

Sides of the body 132 may comprise angled scraper formations 150 which scrape against responding inner sides of the channel 136 to remove any accretion therein. Alternatively, the shuttle may comprise brushes. In the embodiment also shown in FIG. 14, the front, top and bottom of the body 132 also comprise scraper formations 150.

With reference to FIG. 15, the shuttle 107 may comprise a rear belt engagement 148 which may engage the corresponding band of the belt 114. The other band 114 of the belts may run free as is shown.

The metallic eyelet 117 may be held by an engagement 133 which may be made of plastic to be electrically insulative.

The engagement 133 may comprise an annular head 135 and a planar stem 134. The planar stem 134 fits through the gap 138 of the channel 136 and allows the shuttle 107 to travel the length of the rail 103.

FIG. 17 shows wherein the metallic conductor 129 electrically connects the stoppers 125. As is shown in FIG. 17, the metallic conductor 129 may be planar and may be bolted to the side of the channel 136. As alluded to above, the metallic conductor 129 may be inflated by the insulative backing 151. FIG. 17 further shows wherein the hoisting rail 103 can be bolted directly to an existing fence post using a bracket 149.

FIG. 16 shows wherein the electrically connected stopper 125 extents to one side of the shuttle 107. Furthermore, the shuttle 107 may define a side connector 145 electrically connected to the metallic eyelet 111 which thereby electrifies the metallic eyelet 117 when the side connector 145 touches the connected stopper 125.

In embodiments, the length of the side connector 145 may be adjusted by turning the side connector 145 within a socket 146. Similarly, the length of the stopper 125 may be adjusted by turning threading 144 thereof within the conductor 129. Alternatively, the lengths may be adjusted by using side connectors 145 or stoppers 125 of different lengths.

The offset between the side connectors 145 and the stoppers 125 may be adjusted incrementally for each upper shuttle 107.

As such, lower shuttles 107 may travel past stoppers 125 until making contact with an assigned stopper 125 having a configured offset, thereby allowing the strands 101 to be spaced apart when lowered as is shown in FIG. 2 but spaced closer together when raised as shown in FIG. 1. In this regard, only the lowermost belt engagement 148 may be fixed to the belt 114 whereas the belt 114 may freely travel through the engagements 148 of shuttles 107 thereabove (or alternatively the shuttles 107 there above may be free of engagements 148) so that the lowermost shuttle 107 can collect the other shuttles 107 thereabove when travelling up and deposit the shuttles 107 thereabove on respective assigned stoppers 125 when travelling down.

In embodiments, a plurality of stopper holes 152 may be provided along the length of the conductor into which the associated stoppers 125 may be selectively inserted to configure the vertical offset of the strands 101.

As shown in FIG. 18, the channel 136 may be braced at intervals with bracing pins 142.

In embodiments, as opposed to the actuator moving the strands 101 along the hoisting rail 103, the hoisting rail 103 itself is telescopic comprising a plurality of telescopic portions which move relative to each other to raise and lower the strands 101.

The gate 100 may comprise a single pushbutton control to open or close the gate 100. However, as alluded to above, the gate controller may comprise a remote-control receiver to allow for operation of the gate remotely, such as from within a vehicle or the like. The remote-control receiver may both open and/or close the gate. Alternatively, the gate controller may comprise a timer which closes the gate after a certain period.

In embodiments, the gate controller may comprise a proximity sensor which may detect an approaching vehicle so as to open the gate 100 in advance of the vehicle and which automatically closes the gate after the vehicle has passed through the gate.

Whereas in one embodiment, the remote-control receiver comprises a garage remote-type receiver, in alternative embodiments, the control circuitry comprises a Bluetooth receiver for short-range communication with a Bluetooth enabled mobile communication device. Each receiver may have an associated address so that one mobile communication device can control a number of different gates independently.

A software application may be downloaded and installed on the mobile communication device which allows for the setting of the address configuration for each receiver.

The mobile communication device may take various forms, including a mobile phone, smartwatch or the like.

In embodiments, each gate 100 may be visually encoded, such as with a unique identifier or colour so as to aid in identification for the individual control thereof.

In embodiments, the gate 100 may comprise an audio device, such as an electric speaker, siren or the like which is controlled by the gate controller to play a sound at the opening of the gate 100. For example, the gate 100 may be programmed to play a sound to call livestock for feeding through the gate 100 at a certain time.

As alluded to above, the gate 100 may be timed to open and/or close the gate 100 at certain times of day.

In embodiments, the gate may comprise an object detecting sensor between the posts 102 or the rails 103 to detect objects therebetween so as to not lower the electric strands 101 whilst an obstruction remains thereunderneath. The sensor may comprise a light beam interrupt sensor operative across the gate.

In embodiments, the control circuitry may be configured to control more than one gate. For example, two gates 100 may be installed adjacently at 90° so as to, for example, be able to alternatively control access via a thoroughfare or an adjacent paddock gate to direct livestock accordingly. As such, the same gate controller may be used to independently control each gate. In this manner, any number of gates controlled by the same gate controller may be arranged in different configurations, including a four-way intersection of four gates 100. A gate 100 may be set up in a slave mode of operation to act in tandem with a master gate 100.

In embodiments, the gate 100 comprises a gate controller for each of two rails 103 thereof. In accordance with this configuration, one may operate in a slave mode so as to act in tandem with control signals received from the other gate controller.

The gate controller may interface other sensors in embodiments, including soil moisture probes, cameras, weather stations, rain sensors, electric fence monitors and or the like. In this way, the operation of the gate 100 may be controlled in a number of manners, such as allowing livestock to return from grazing fields during rain, to close the gate once a camera visually ascertains no more livestock remaining within a padlock and the like. In embodiments, the gate controller may interface remote sensors, including data obtained from satellite sensors.

In embodiments, the gate 100 may record data obtained from the sensors.

The gate 100 may comprise a data interface for communicating across a mobile phone network for remote-control from any location around the world. Furthermore, the gate 100 may be controlled using an IOT network such as NBIOT, LoRaWAN or the like. In embodiments, the gate 100 may have a satellite data communication interface for remote operation beyond terrestrial data networks.

In embodiments, the data interface may act as a data repeater station or node in a mesh network.

In embodiments, as opposed to hosting individual electric strands 100 in the manner outlined above, the gate 100 may hoist lightweight flexible netting or mesh which may include electrified wire weave.

In embodiments, the gate 100 may electrically connect to an adjacent electric fence 106. However, in embodiments, the gate 100 may have its own energiser for electrifying the strands 100, including that which draws power from the battery and solar panel 122. As such, the gate 100 may take various configurations, including wherein the gate 100 electrically connects to an adjacent electric fence 106, wherein the gate 106 has its own electric strand energiser powered from the battery within the box and solar panel 122, wherein a separate energiser is mounted to the side of the rail 103 having its own battery and solar panel or, for the latter two options, wherein the gate 100 energises the adjacent electric fence 106 itself.

In embodiments, the belt 114 may be held in the open position to prevent the strands 101 falling. Such may be provided by the gearing 117, which may include a worm drive so that the belt 114 cannot move without operation of the electric motor 113, or other mechanism, such as positioned magnets sufficient to hold the weight of the electric strands 101.

In embodiments, the gate 100 may have a mechanism to pull the shuttles 107 that aren't fixed to the belt 114 down from the open position to the closed position. This mechanism may include tethers (small rope or cord) to connect all the shuttles 107 together so the bottom shuttle 107 will pull the rest of the shuttles 107 down, magnets or clips of varying strength between the shuttles 107 to connect the shuttles 107 together on the down stroke but wherein the shuttles 107 would then separate when they hit their respective stopper 125, a ratchet style catch mechanism mounted on the shuttle 107 that latches to the belt 114 on the down stroke which disengages when the ratchet catch mechanism hits the stopper 125 or protrusions mounted to the belt 114 of varying depth to catch their associated shuttle 107 on the down stroke.

In embodiments, the gate 100 may comprise position sensors to sense the positions of the electric strands 101. For example, the gate controller may interface a rotary encoder interfacing the motor 130 of the belt 114. In this way, the gate controller may ascertain if the gate 100 fails to open or close.

In embodiments, the gate 100 may employ security access control so that only authorised controllers may open or close the gate 100. Furthermore, the gate 100 may be physically attached to the posts 102 with lock and key to prevent removal thereof.

In embodiments, the gate controller may expose an API or the like to be controlled with third-party software, such as farm automation or management software. Alternatively, the gate controller may interface with an API of such software.

In embodiments, the gate controller may store historic operation data indicative of the dates and times of the opening and closing of the gate 100, including the identity of the operator.

In embodiments, the gate controller could be placed in a "drafting mode", so the gate controller remains active/connected at all times for faster response, wherein the strands 101 would only be lifted to a specified minimum height and wherein the motor 113 operates faster. Such could be used during drafting (i.e. separating animals out of herds) where the gate is required to operate quickly.

The foregoing description, for purposes of explanation, used specific nomenclature to provide a thorough understanding of the invention. However, it will be apparent to one skilled in the art that specific details are not required in order to practise the invention. Thus, the foregoing descriptions of specific embodiments of the invention are presented for purposes of illustration and description. They are not intended to be exhaustive or to limit the invention to the precise forms disclosed as obviously many modifications and variations are possible in view of the above teachings. The embodiments were chosen and described in order to best explain the principles of the invention and its practical applications, thereby enabling others skilled in the art to best utilize the invention and various embodiments with various modifications as are suited to the particular use contemplated. It is intended that the following claims and their equivalents define the scope of the invention.

The term "approximately" or similar as used herein should be construed as being within 10% of the value stated unless otherwise indicated.

The invention claimed is:

1. An electric strand gate comprising:
   at least one electric strand;
   an actuator which moves the at least one electric strand up along a hoisting rail from a closed position to an open position so as to provide clearance thereunderneath for passage through the gate; and
   a shuttle travelling along the hoisting rail, wherein the electric strand is connected to the shuttle.

2. The gate as claimed in claim 1, wherein the at least one electric strand provides at least 4 m of clearance thereunderneath in the open position.

3. The gate as claimed in claim 1, wherein the actuator moves only one side of the at least one electric strand.

4. The gate as claimed in claim 3, wherein the at least one electric strand lengthens across the gate when being hoisted at one side.

5. The gate as claimed in claim 1, wherein the actuator moves both sides of the at least one electric strand up so that the at least one electric strand remains substantially horizontal between the closed and open positions.

6. The gate as claimed in claim 5, wherein the gate comprises a pair of hoisting rails and the shuttle includes first and second shuttles travelling along each respective one of the pair of hoisting rails and wherein the at least one electric strand is connected between the first and second shuttles.

7. The gate as claimed in claim 1, the gate is configured to open an electric circuit with the at least one electric strand when moving the at least one electric strand to the open position.

8. The gate as claimed in claim 1, wherein the gate comprises a plurality of electric strands and wherein the actuator moves all of the plurality of electric strands up from the closed position to the open position.

9. The gate as claimed in claim 8, wherein the plurality of electric strands are closer together at the open position as compared to at the closed position.

10. The gate as claimed in claim 1, wherein the hoisting rail comprises an open channel therealong, the shuttle travels within the hoisting rail and wherein the at least one electric strand connects to the shuttle via the open channel.

11. The gate as claimed in claim 1, wherein the shuttle comprises a metallic eyelet protruding through the open channel which connects a hook of the at least one electric strand.

12. The gate as claimed in claim 1, wherein the actuator comprises a drive motor driving a looped belt along the hoisting rail and wherein the shuttle is connected to the belt.

13. The gate as claimed in claim 12, wherein the gate comprises a plurality of electric strands and respective shuttles driven by the looped belt.

14. The gate as claimed in claim 13, wherein a lowermost shuttle is affixed to the belt whereas other shuttles thereabove slidably engage the belt so that the lowermost shuttle collects the other shuttles thereabove when travelling up the hoisting rail.

15. The gate as claimed in claim 14, wherein the hoisting rail comprises stoppers for respective shuttles, the stoppers positioned to position the respective shuttles in the closed position.

16. The gate as claimed in claim 15, wherein the respective shuttles comprise side channels defining an engagement edge and wherein the side channels of lower ones of the respective shuttles increase in depth and wherein an extent of lower ones of the stoppers increases so that each one of the stoppers collects a respective shuttle by an engagement edge thereof depending on the extent of the stopper and a depth of the channel.

17. The gate as claimed in claim 16, wherein the stoppers form an electrical connection with the engagement edge for electrically connecting a respective one of the plurality of electric strands.

18. The gate as claimed in claim 15, wherein the respective shuttles comprise connectors which contact the stoppers and wherein an offset between respective ones of the connectors and the stoppers are adjustable so that each side of the stoppers collects a respective one of the respective shuttles depending on a length thereof and wherein a plurality of stopper holes are provided along a length of the hoisting rail for providing a selective vertical offset configuration of the stoppers.

19. An electric strand gate comprising:
at least one electric strand; and
an actuator which moves the electric strand up along a hoisting rail from a closed position to an open position so as to provide clearance thereunderneath for passage through the gate, wherein:
the gate comprises a plurality of electric strands and wherein the actuator moves all of the electric strands up from the closed position to the open position; and
the electric strands are closer together at the open position as compared to at the closed position.

20. An electric strand gate comprising:
at least one electric strand; and
an actuator which moves the electric strand up along a hoisting rail from a closed position to an open position so as to provide clearance thereunderneath for passage through the gate, wherein
ends of the at least one electric strand move along a length of the hoisting rail when the gate moves between the open position and the closed position.

* * * * *